US006288334B1

United States Patent
Hennum

(10) Patent No.: US 6,288,334 B1
(45) Date of Patent: Sep. 11, 2001

(54) ELECTRONICS MODULE ATTACHED TO BACK FACE OF JACK PLATE

(75) Inventor: Richard D. Hennum, Tinton Falls, NJ (US)

(73) Assignee: Antec Corporation, Duluth, GA (US)

( * ) Notice: Subject to any disclaimer, the term of this patent is extended or adjusted under 35 U.S.C. 154(b) by 0 days.

(21) Appl. No.: 09/386,242

(22) Filed: Aug. 31, 1999

(51) Int. Cl.⁷ .................................................. H02G 3/08
(52) U.S. Cl. ............................................. 174/52.1; 174/56
(58) Field of Search ............................. 174/52.1, 53, 54, 174/55, 56, 58; 361/728, 736, 741, 742, 752, 756, 816

(56) References Cited

U.S. PATENT DOCUMENTS

| | | |
|---|---|---|
| 4,589,719 | 5/1986 | Gentry . |
| 5,114,365 | 5/1992 | Thompson . |
| 6,118,347 * | 9/2000 | Ohira ....................................... 331/68 |
| 6,144,562 * | 11/2000 | Voelzke et al. . |
| 6,186,826 | 2/2001 | Weikle . |

* cited by examiner

Primary Examiner—Peter S. Wong
Assistant Examiner—Gary L. Laxton
(74) Attorney, Agent, or Firm—Troutman Sanders LLP; Gerald R. Boss

(57) ABSTRACT

A module for allowing an enclosure containing circuitry or electronics to be connected to the back of a jack plate behind the surface of a wall. The electronics module may be, for example, an ADSL POTS splitter for isolating voice-band services from ADSL data and voice services at the subscriber premises. The module includes a generally rectangular enclosure that has at least two legs for being inserted into holes in the jack plate to attach the enclosure to the jack plate. The legs preferably extend downwardly below the bottom of the enclosure and are preferably located as far apart from each other as possible, such as on diagonal corners of a rectangular enclosure. The legs of the enclosure are inserted into the holes on the back face of the jack plate, which faces inwardly into the stud cavity of the wall when attached to a wall box. In this manner, the module is attached to the back face of the jack plate in the stud cavity of a wall, thereby achieving an aesthetically pleasing, space-saving connection.

2 Claims, 2 Drawing Sheets

ELECTRONICS MODULE ATTACHED TO BACK FACE OF JACK PLATE

FIELD OF THE INVENTION

The invention relates generally to electronics for connection to a telephone line, and more specifically, to an electronics module that is connected to the back of a jack plate behind the surface of a wall.

BACKGROUND OF THE INVENTION

In communications networks such as telephone systems, various electronics are located at the subscriber's dwelling, such as a business, home, or apartment. For dwellings wired with an Asynchronous Digital Subscriber Line (ADSL), which provides high speed data service, an electronics module called a POTS (Plain Old Telephone Service) splitter is required to allow data and voice to be combined together on one twisted pair line. The POTS splitter is essentially a low pass filter that attenuates the data signal, and passes the voice signal.

Typically, for indoor ADSL service at a dwelling where no network interface device (NID) is provided, such as at an apartment building, the data and voice signals must be separated at the point where the line first enters the dwelling. In apartments, this is typically in the kitchen of each apartment unit.

Existing methods of separating the data and voice signals include mounting an electronics module on the outer surface of the wall, such as at the bottom of the wall. Not only is this surface-mounted module aesthetically unpleasing, but it is susceptible to damage from contact with persons or objects in the dwelling.

Therefore, there is a need in the art for a method and device for housing electronics that are connected to a telephone line to be attached behind the surface of a wall rather than on the surface of the wall.

SUMMARY OF THE INVENTION

The present invention is a module for allowing an enclosure containing circuitry or electronics to be connected to the back of a jack plate behind the surface of a wall. The electronics module may be, for example, an ADSL POTS splitter for isolating voice-band services from ADSL data and voice services at the subscriber premises. The module includes a generally rectangular enclosure that has at least two legs for being inserted into holes in the jack plate to attach the enclosure to the jack plate. The legs preferably extend downwardly below the bottom of the enclosure and are preferably located as far apart from each other as possible, such as on diagonal corners of a rectangular enclosure. The legs of the enclosure are inserted into the holes on the back face of the jack plate, which faces inwardly into the stud cavity of the wall when attached to a wall box. In this manner, the module is attached to the back face of the jack plate in the stud cavity of a wall, thereby achieving an aesthetically pleasing, space-saving connection.

DETAILED DESCRIPTION

The present invention allows a module to be connected to the back of a jack plate behind the surface of a wall. The module may contain, for example, an ADSL POTS splitter for isolating voice-band services from ADSL data and voice services at the subscriber premises. The output of the ADSL POTS splitter provides the interface for the voice-band POTS capability distributed throughout the dwelling.

Figure 1:
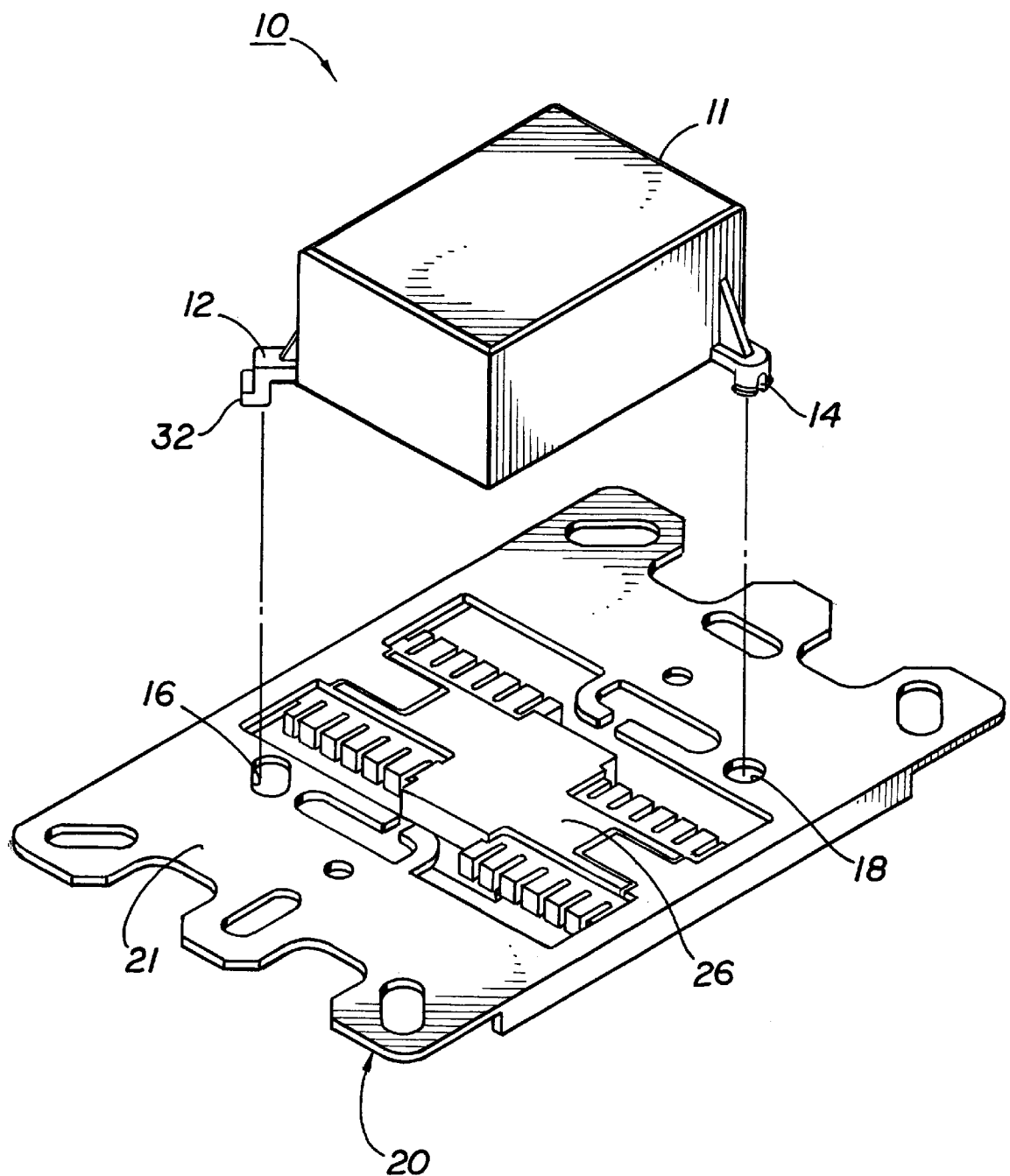
FIG. 1 is a perspective view of a module for being connected to the back face of a jack plate in accordance with the present invention.

The preferred embodiment of the module in accordance with the present invention is shown in FIG. 1. The module 10 includes a generally rectangular enclosure 11 that contains the required circuitry or electronics, for example, an ADSL POTS splitter. The electronics within the module can be encapsulated in a sealant material to protect the electronics from environmental and other hazards. The enclosure shown in FIG. 1 is generally rectangular and includes at least two legs 12 and 14 for fitting into holes 16 and 18, respectively, of jack plate 20. However, it should be understood that the enclosure may be any suitable shape or size.

Figure 2:
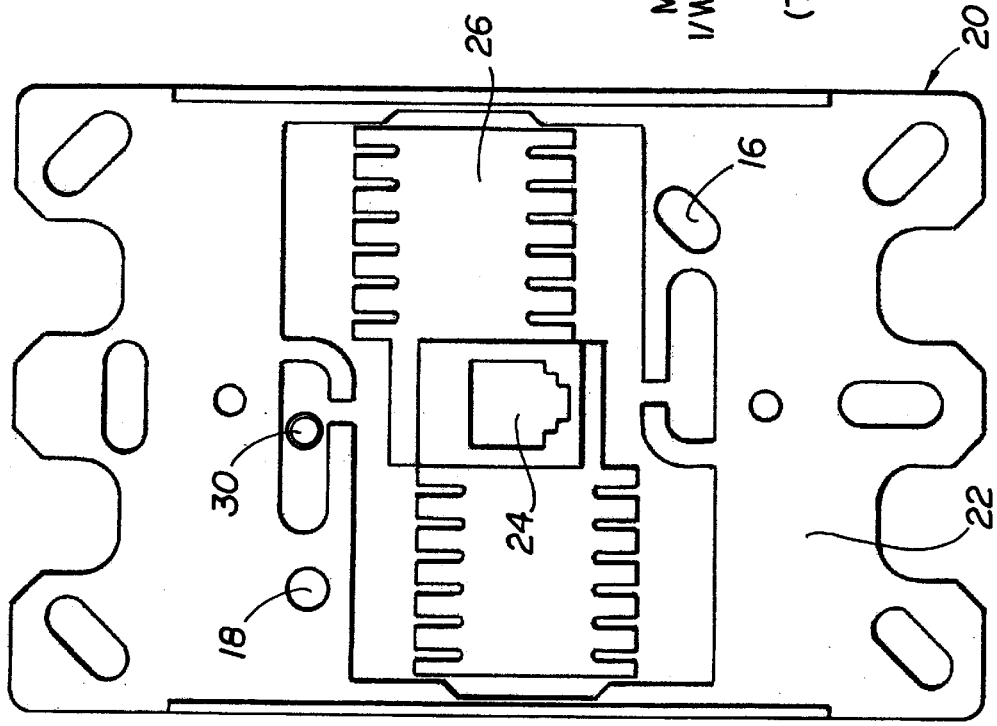
FIG. 2 is a plan view of an exemplary jack plate, with the IDC termination grid and jack installed thereon.

Jack plate 20, as well known in the art is removably attached to a wall box in a stud cavity in the wall. Jack plate 20 has a back face 21 as shown in FIG. 1, and a front face 22 as shown in FIG. 2. When the jack plate is installed in the wall box in the stud cavity of the wall, the front face 22 faces outwardly and the back face 21 faces inwardly, into the stud cavity of the wall. A jack 24, such as an RJ11 or RJ14 telephone wall jack, is provided on the front face 22 of the jack plate, thus providing a subscriber with access to the jack to connect a telephone thereto. A cover (not shown) is installed over the front face 22 of the jack plate to provide access to the jack but conceal the remainder of the jack plate. The jack plate shown in FIG. 1 is part of a SE 630 Series Wall Jack manufactured by Suttle Apparatus Corporation, but the jack plate may be any other suitable type, model, or configuration.

Preferably, legs 12 and 14 extend from the bottom or sides of the enclosure 11 and are located as far apart as possible, such as the legs on diagonal corners of the enclosure as shown in FIG. 1. If the enclosure is non-rectangular, the legs should preferably be located on opposite sites of the enclosure. The legs are preferably integrally formed with the enclosure and are constructed of resilient material. It will be understood by those skilled in the art that the holes 16 and 18 shown on the jack plate in FIG. 1 are merely an example of holes that may be present on a jack plate. Many other variations of holes, slots, or other apertures may be provided on jack plates, and the legs can be located at appropriate locations on the enclosure so as to mate with any jack plate aperture configuration. Therefore, the present invention should not be construed to be limited to the configuration of the jack plate shown in FIG. 1, or to any particular jack plate.

Figure 3:
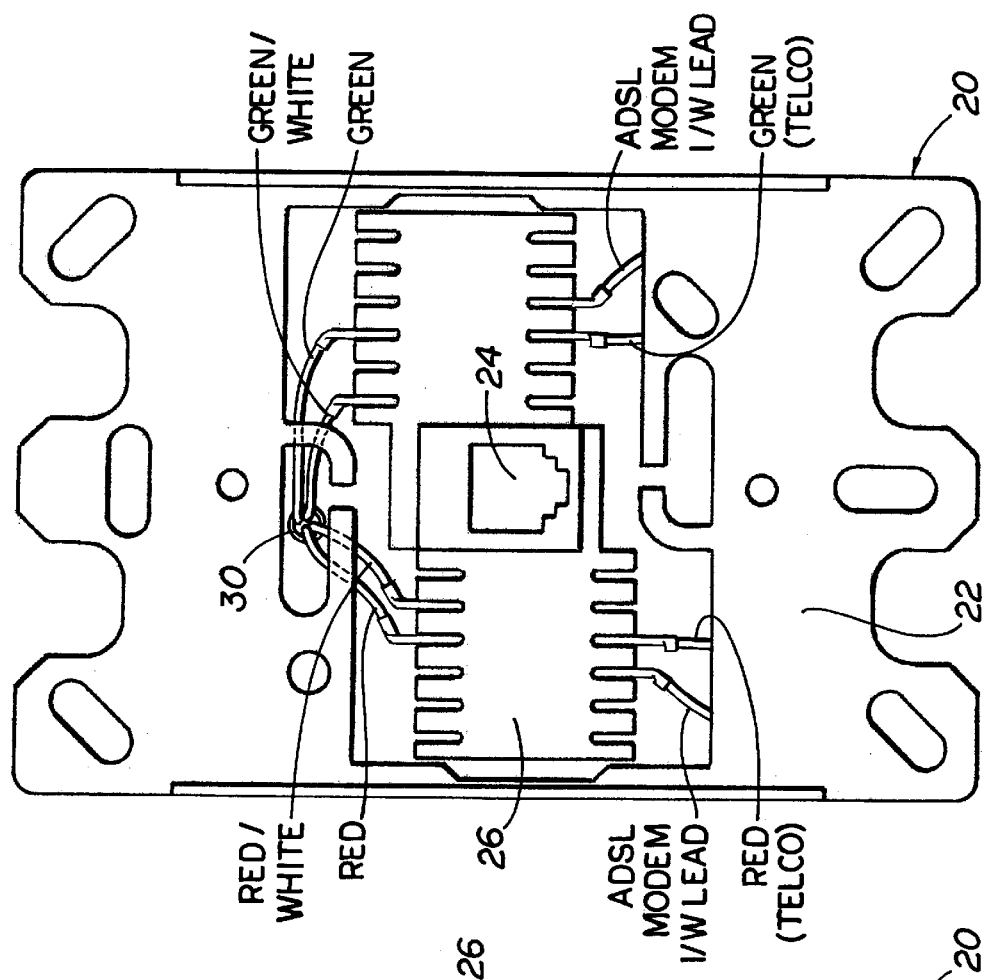
FIG. 3 shows the connections between the wires exiting the module and the telephone wires connected to the jack plate.

The back face 21 of the jack plate also includes an IDC termination grid 26 onto which the wires exiting the module 10 are connected. IDC connections are made in the slots of the IDC termination grid, as is well known in the art. Typical connections made on the IDC termination grid are shown in FIG. 3.

To connect the module to the jack plate, a hole 30 is made in a plastic protective sheath on the jack plate, if such a sheath exists. The two twisted pair lead wires exiting the module are routed through the hole in the protective sheath, and the legs 12 and 14 of the enclosure are inserted into holes 16 and 18, respectively, on the jack plate. Preferably, leg 12 has a lower lip 32 extending outwardly from the leg, as shown in FIG. 1. This lip is first inserted through hole 16 and then the module is lowered onto the jack plate such that leg 14 snaps into hole 18. In this manner, the lip 32 of leg 12 contacts the front face 22 of the jack plate, thereby preventing the module from falling away from the back face of the jack plate. It will be understood that each leg may extend downwardly a certain distance below the bottom edge of the enclosure 11 so as to give the module adequate clearance above the back face 21 of the jack plate when the legs are inserted into the holes. The proper connections on the IDC termination grid are then made, and the jack plate is attached to the wall box in the stud cavity in the wall. In this manner, the module is properly connected to the jack plate behind the surface of the wall.

The present invention provides several advantages over existing implementations. The attachment of the module to the back face of the jack plate is aesthetically pleasing because the module is hidden from view in the wall cavity behind the jack plate. The installation of the module behind the surface of the wall is also space-saving and protects the module from damage due to inadvertent contact or other hazards commonly found in the home. The attachment of the module to the back face of the jack plate also prevents the module from falling into the wall cavity away from the jack plate and provides strain relief for the wires exiting the module and connected to the IDC termination grid on the jack plate.

While the preferred embodiments of the invention have been shown and described, it will be obvious to those skilled in the art that various modifications and alterations can be made thereto without departing from the spirit and scope of the invention as defined in the appended claims.

What is claimed is:

1. An in-wall module assembly for mounting in a wall with a predetermined cut-out for receiving at least a data signal and a non-data signal for use with a telephone system, the electrical module assembly comprising:

a housing defining an interior said housing having a profile not greater than said predetermined cut-out;

one or more outside line connectors for receiving said data signal from a first outside line, and a non-data signal from a second outside line;

a logic processor contained within the interior of said housing for processing said data signal and said non-data signal into a combined signal;

a communication connector carried by said housing adapted for transmitting said combined signal to said telephone system, and a mounting plate comprising a back side, and a front side, said housing mounted on said back side of said mounting plate;

wherein said housing may be received within a wall through said predetermined cut-out exposing only the front side of said mounting plate externally of the wall.

2. The electrical module of claim 1, wherein said housing is releasably attached to said back side of said mounting plate.

* * * * *